United States Patent Office 2,705,426
Patented Apr. 5, 1955

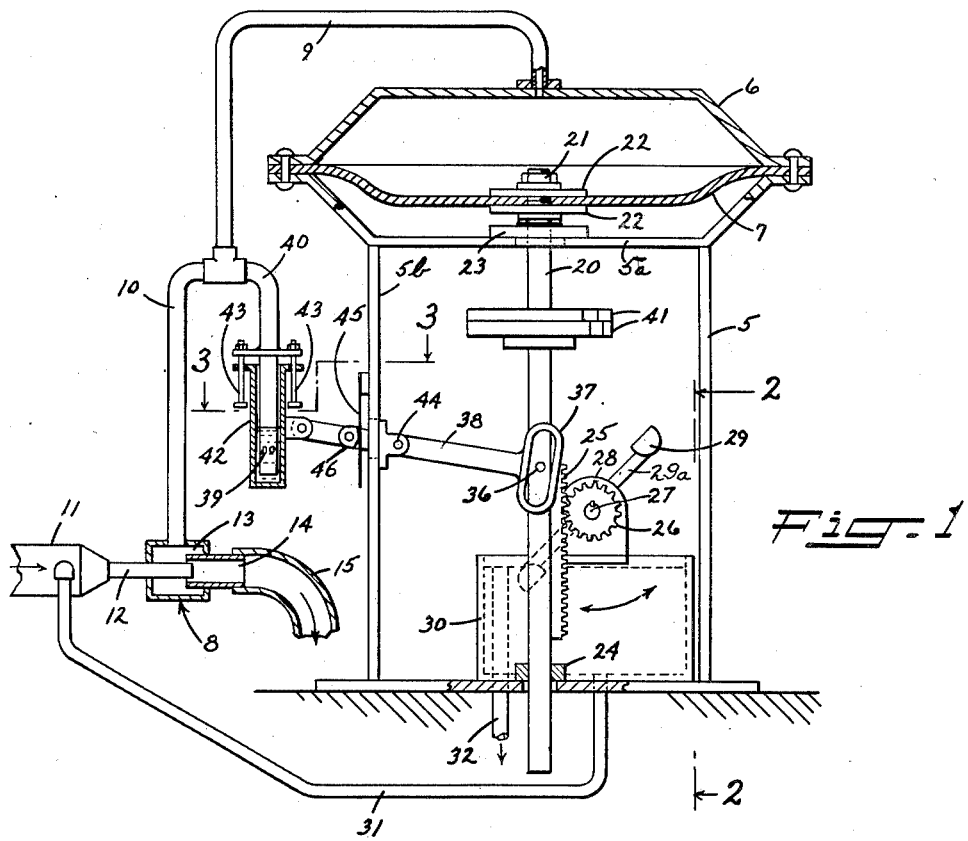

2,705,426

SELF-POWERED SAMPLING DEVICE

Harold A. Haley and James N. McIntire, Parkersburg, W. Va., assignors to American Viscose Corporation, Philadelphia, Pa., a corporation of Delaware Application February 23, 1954, Serial No. 411,833

7 Claims. (Cl. 73—423)

This invention relates to automatic liquid-sampling mechanism and, more particularly, to such a device so constructed that the actuation is achieved solely through the flow of the liquid to be sampled.

In the operation of large chemical processing plants, it frequently becomes necessary to obtain representative samples of waste liquid. This may be necessary to prevent stream pollution or to enable better control of the various processes. Very often the point at which the sample must be taken is far removed from a convenient source of external power so that it becomes highly desirable to construct a device which will take periodic samples of the liquid discharged and collect these samples in a suitable receptacle. The present apparatus is designed to obtain such samples solely through power derived from the flow of the liquid being sampled.

A primary object of the present invention therefore is to provide a self-powered liquid-sampling device.

A further object of the invention is to provide, in apparatus of the type described, a suction-actuated collecting cup which periodically obtains a predetermined sample of liquid.

A further object of the invention is to provide, in liquid flow testing apparatus, a suction-producing injector, a diaphragm actuated by this suction and a sampling cup operatively connected to the diaphragm for obtaining a sample of liquid upon each actuating cycle of the diaphragm.

A still further object of the invention is to provide, in apparatus of the class described, means for periodically holding and breaking the suction to the diaphragm.

Further objects will be apparent from the specification and drawings in which:

Figure 1 is a vertical sectional view of a preferred embodiment of the present invention;

Figure 2 is a sectional detail as seen at 2—2 of Figure 1 showing the sampling cup in a moved position; and Figure 3 is an enlarged sectional detail as seen at 3—3 of Figure 1.

A preferred embodiment of the invention comprises essentially the provision of a vertically movable shaft which is controlled by a diaphragm at one end thereof. The shaft is suitably weighted so that when atmospheric pressure is present on both sides of the diaphragm the shaft drops, thereby turning a horizontal shaft to which a sampling cup is attached. When the shaft reaches the bottom of its downward stroke, a vent in the vacuum line to the diaphragm is closed, thereby permitting the vacuum to gradually build up in the diaphragm chamber, thus raising the shaft and pivoting the sampling cup to obtain a second sample. When the shaft reaches a predetermined upper limit position, the vacuum vent to the diaphragm chamber is opened, thus permitting the cycle to repeat. An injector for producing the required vacuum is employed in the liquid discharge line being sampled, and a bleeder line or by-pass maintains the proper liquid level in a sampling tank to fill the sampling cup when it is actuated by the diaphragm shaft.

Referring now more particularly to the drawings, framework 5 supports a diaphragm chamber 6 which contains a vertically movable flexible diaphragm 7. The upper portion of chamber 6 is connected to an injector 8 through conduits 9 and 10. The injector 8 is connected to a fluid discharge line 11 so that the pressure in the fluid discharge line nozzle 12 induces a vacuum in the chamber 13 to which the conduit 10 is connected. The restriction 14 receives the liquid discharged from nozzle 12 from whence it flows through the outlet 15. The general construction and operation of an injector of this type forms no part of the present invention and is well-known in the art.

A vertically reciprocable shaft 20 is connected at its upper end to diaphragm 7 by means of nut 21 and washers 22, 22. An abutment 23 on the shaft engages the cross member 5a of the frame 5 to define the downward limit of shaft and diaphragm movement. The lower end of the shaft may be slidably journaled or guided in a bushing 24 as shown in Figure 1. Intermediate the ends of shaft 20, we provide a rack 25 which actuates a pinion 26 keyed to a horizontal shaft 27 (Figure 2) journaled in bearing blocks 28, 28. A sampling cup 29 is attached to shaft 27 and positioned to pass through the liquid to be sampled in the sampling tank or trough 30. A by-pass liquid line 31 introduces sampling liquid to tank 30 from main conduit 11, and an overflow 32 maintains the desired level of liquid in the tank.

In the position of the device as shown in Figure 1, the shaft 20 is at its maximum downward position, and the sampling cup 29 is elevated so that the liquid sample previously collected has drained through the hollow extension 29a for the cup and through the hollow overhanging end 27a of shaft 27. The liquid sample is collected in a suitable receptacle directly under the end of shaft 27a or at a more remote location, in which event a flexible tube is connected to the end of the shaft to carry the sampled liquid to the receptacle. Gradually the vacuum in chamber 6 builds up through lines 9 and 10 which in turn raises diaphragm 7 and, consequently, shaft 20. This action rotates shaft 27 approximately through an arc of 180° until the sampling cup 29 reaches the dotted-line position shown in Figure 1 having passed substantially through the liquid in sampling tank 30.

A pin 36 on shaft 20 engages the yoke 37 on lever arm 38 so that when the shaft 20 reaches a maximum upward position the orifices 39 in vent pipe 40 connected between conduits 9 and 10 are exposed to atmospheric pressure. This breaks the vacuum in chamber 6, thus permitting the shaft 20 to fall under the influence of one or more weights 41, 41 positioned on the shaft. The mechanism for opening and closing the orifices in vent 40 may take a variety of forms, but in the present embodiment, a cup 42 filled with mercury is slidably connected to one end of the lever arm 38. Hangers 43, 43 retain the cup in the proper spaced relation to vent pipe 40 and also serve as limit stops for downward movement thereof. The lever 38 is fulcrumed at 44 and also provided with a snap-lock device 45 comprising a flat spring 45a mounted at one end to the upright frame member 5b. A lug 46 having two angle flats for engaging spring 45a is connected to the lever 38 as shown in Figure 3. Pressure of spring 45a on the flat faces of lug 46 retains the cup 42 in either the open or closed position until the lever 38 is actuated by pin 36.

After the vacuum in chamber 6 is released, as described above, shaft 20 drops to its lower position whereupon pin 36 contacts yoke 37 to pivot lever 38, raise cup 42 and close the vacuum vent. Concurrently the sample cup pivots through its normal operating arc to collect a liquid sample from the tank and discharge the sample into receptacle 35.

It will thus be understood that the present device is extremely simple and foolproof. It requires no external source of power to actuate the moving parts. The timing of the cycle is readily adjusted by changing the total weight placed on shaft 20 and/or varying vacuum between injector 8 and chamber 6. A very satisfactory embodiment is adjusted to obtain approximately a two-quart sample in twenty-four hours using seven-minute cycles.

Having thus described our invention, we claim:

1. A self-powered sampling device comprising a vacuum chamber, a diaphragm in said vacuum chamber, a shaft connected to said diaphragm and positioned for vertical movement therein, a vacuum conduit connected to the top of said chamber for lowering the pressure in the chamber above the diaphragm and raising the shaft, a sampling cup below the chamber and actuated by vertical movement of the shaft, a sampling tank through which said cup passes, a vent on the vacuum line, means for opening said vent when the shaft and diaphragms reach a predetermined upper limit of travel, and means for closing the vent when the shaft and diaphragm fall to a predetermined lower limit of travel.

2. A vacuum-actuated sampling device comprising a vacuum chamber, a suction line connected to said vacuum chamber and having a vent therein, a diaphragm in said vacuum chamber, a shaft connected to and movable with said diaphragm, a liquid-sampling device connected to said shaft, a liquid-sampling tank through which said sampling device passes during movement of the shaft, and means operable by movement of the diaphragm and shaft to selectively open and close a vent in the suction line.

3. A liquid-sampling device comprising a liquid-sampling tank, means for maintaining a substantially constant liquid level in said tank, a liquid-sampling cup mounted over said tank and oscillatable through an arc at least partially below the surface of the liquid in the tank, a discharge conduit connected to said sampling cup, said cup being movable in one direction under the influence of gravity, and means responsive to movement of said cup in said one direction to reverse the movement of the cup.

4. A liquid-sampling device comprising a liquid-sampling tank, a liquid inlet conduit for supplying a liquid to said tank, an overflow for said tank to maintain a substantially constant liquid level therein, a horizontal shaft pivotally journaled above said tank, a portion of said shaft being hollow, a sampling cup mounted on said shaft and having a hollow passage connecting with the hollow portion of the shaft, a vertical oscillating shaft, means drivingly connecting the vertical shaft and the horizontal shaft for turning the sampling cup through the liquid in the sampling tank to an elevated position in which the liquid is discharged through the hollow shaft, a fluid pressure chamber connected to the vertical shaft, and means operable by reciprocation of the vertical shaft for controlling the inlet and outlet of fluid into said chamber.

5. A liquid-sampling device comprising a liquid-sampling tank, a liquid inlet conduit for supplying a liquid to said tank, an overflow for said tank to maintain a substantially constant liquid level therein, a horizontal shaft pivotally journaled above said tank, a portion of said shaft being hollow, a sampling cup mounted on said shaft and having a hollow passage connecting with the hollow portion of the shaft, a vertical oscillating shaft, means drivingly connecting the vertical shaft and the horizontal shaft for turning the sampling cup through the liquid in the sampling tank to an elevated position in which the liquid is discharged through the hollow shaft, a fluid pressure chamber connected to the vertical shaft, means operable by reciprocation of the vertical shaft for controlling the inlet and outlet of fluid into said chamber, and means for loading the shaft downwardly to permit it to fall.

6. Apparatus in accordance with claim 5 in which the fluid chamber is suction operated.

7. Apparatus in accordance with claim 5 having a fluid source of relatively low pressure, a low pressure conduit between said source and the chamber means for selectively venting said low pressure conduit.

References Cited in the file of this patent

UNITED STATES PATENTS

| | | |
|---|---|---|
| 1,874,395 | Watts | Aug. 30, 1932 |
| 1,964,270 | Nidever et al. | June 26, 1934 |
| 2,270,511 | Crain | Jan. 20, 1942 |
| 2,327,123 | Morse | Aug. 17, 1943 |
| 2,336,539 | Gilbert | Dec. 14, 1943 |
| 2,388,801 | Roetman | Nov. 13, 1945 |
| 2,400,046 | Hummel | May 7, 1946 |